(12) United States Patent
Xie et al.

(10) Patent No.: US 8,104,954 B2
(45) Date of Patent: Jan. 31, 2012

(54) APPARATUS AND METHOD FOR MEASURING THE SURFACE TEMPERATURE OF CONTINUOUS CASTING BILLET/SLAB

(75) Inventors: Zhi Xie, Shenyang (CN); Zhenwei Hu, Shenyang (CN); Ying Ci, Shenyang (CN); Da Zhang, Shenyang (CN)

(73) Assignees: Northeastern University, Shenyang (CN); Shenyang Taihe Metallurgy Measurement & Control Technology Co., Ltd., Shenyang (CN)

( * ) Notice: Subject to any disclaimer, the term of this patent is extended or adjusted under 35 U.S.C. 154(b) by 570 days.

(21) Appl. No.: 12/309,183

(22) PCT Filed: Oct. 24, 2007

(86) PCT No.: PCT/CN2007/003038
§ 371 (c)(1),
(2), (4) Date: Jan. 9, 2009

(87) PCT Pub. No.: WO2009/052648
PCT Pub. Date: Apr. 30, 2009

(65) Prior Publication Data
US 2010/0236743 A1   Sep. 23, 2010

(51) Int. Cl.
*B22D 11/16* (2006.01)
*G01J 5/08* (2006.01)
(52) U.S. Cl. ........ 374/121; 374/137; 374/141; 374/208; 164/451; 164/151.4
(58) Field of Classification Search .................. 374/121, 374/124, 130, 131, 133, 137, 139, 140, 141, 374/142, 208, 209; 164/4.1, 151.4, 451, 164/452
See application file for complete search history.

(56) References Cited

U.S. PATENT DOCUMENTS
3,597,597 A * 8/1971 Pirlet et al. .................... 250/340
(Continued)

FOREIGN PATENT DOCUMENTS
CN   1410189   4/2003
(Continued)

OTHER PUBLICATIONS

Derwent 2008-G31721 abstract of KR 775085 B1, titled "Apparatus for measuring the temperature of a continuous casting slab, capable of increasing the reliability of temperature measurement on the surface of the casting slab", published Nov. 8, 2007, Inventor: Lee, S.P., Assignee: POSCO[POSC].*

*Primary Examiner* — Richard A Smith
(74) *Attorney, Agent, or Firm* — Lau & Associates

(57) ABSTRACT

The present invention discloses a method and apparatus for measuring the temperature field on the surface of casting billet/slab, including: a thermal imager, an infrared radiation thermometer, a mechanical scanning unit, an image and data processing system; the thermal imager, the infrared radiation thermometer and the mechanical scanning unit are respectively connected to the image and data processing system; the infrared radiation thermometer is installed on the mechanical scanning unit and can measure the temperature of casting billet/slab surface by scanning; the thermal imager can measure the temperature of a certain area on the surface of casting billet/slab by thermal imaging. The present invention makes use of the combination of high-resolution thermal imager and scan-type infrared radiation thermometer, through the model-based filtering method, overcomes the influence of iron scales on the surface of casting billet/slab, and implements real-time stable measurement of surface temperature of casting billet/slab.

10 Claims, 3 Drawing Sheets

U.S. PATENT DOCUMENTS

| | | | |
|---|---|---|---|
| 4,024,764 A * | 5/1977 | Shipman et al. | 374/104 |
| 4,365,307 A * | 12/1982 | Tatsuwaki et al. | 702/134 |
| 5,694,480 A * | 12/1997 | Itakura | 382/141 |
| 7,549,797 B2 * | 6/2009 | Myhre | 374/179 |
| 2004/0150951 A1 * | 8/2004 | Yatougo et al. | 361/690 |
| 2008/0198900 A1 * | 8/2008 | Myhre | 374/179 |

FOREIGN PATENT DOCUMENTS

| | | |
|---|---|---|
| CN | 1483533 A | 3/2004 |
| CN | 2645056 Y | 9/2004 |
| CN | 1958193 A | 5/2007 |
| JP | 55133858 A * | 10/1980 |
| JP | 58090362 A * | 5/1983 |
| JP | 59094024 A * | 5/1984 |
| JP | 59223152 A * | 12/1984 |
| JP | 60015059 A * | 1/1985 |
| JP | 3-187583 A | 8/1991 |
| JP | 04162949 A * | 6/1992 |
| JP | 3135282 B2 * | 2/2001 |
| JP | 2005249723 A * | 9/2005 |
| KR | 10-0642780 B1 | 10/2006 |
| SU | 1576228 A1 | 7/1990 |

* cited by examiner

APPARATUS AND METHOD FOR MEASURING THE SURFACE TEMPERATURE OF CONTINUOUS CASTING BILLET/SLAB

FIELD OF INVENTION

The present invention relates to a temperature measuring apparatus for measuring the surface temperature of continuous casting billet/slab during the continuous casting process and a method of measuring the surface temperature of billet/slab by using the temperature measuring apparatus.

BACKGROUND OF THE INVENTION

Inner qualities of continuous casting billet/slab such as crack and porosity are mainly affected by distribution and intensity of the secondary cooling water, the surface temperature of billet/slab during the continuous casting process is an important feedback parameter in the secondary cooling water control. However, it is hard to measure the surface temperature of billet/slab because of iron scale producing randomly on it and abominable measuring conditions such as high temperature and tense steam, etc. This technique problem has not been well tackled yet, and this is the main reason for not realizing closed-loop control of secondary cooling water in continuous casting.

A Chinese patent with the Publication Number CN1410189 discloses a kind of "Method for Accurately Measuring the Casting Billet Surface Temperature in the Secondary Cooling Zone of Continuous Casting", in which several infrared radiation thermometer are employed to measure the temperatures of many fixed points on the surface of casting billet/slab, and the maximum value obtained from these temperature measurement points within every 30 seconds to 2 minutes is chosen as the accurate temperature value of the surface of casting billet/slab. The shortcomings of the mentioned method lies: in the first place, for the reason that the iron scale on the surface of the casting billet arises randomly, the maximum temperature values measured during different sampling periods even at the same point vary significantly, that is, the influence of the iron scale is not overcome well so that the measured temperature value is unstable; in the second place, the sampling period of 30 seconds to 2 minutes has a long lag time, thus real-time feedback and control of the secondary cooling water cannot be realized.

Due to the strong oxidizing environment and the strong water cooling operation in continuous casting, the iron scales with uneven thicknesses and unpredictable location that are randomly generated on the surface of the casting billet/slab are different from those evenly distributed on the surface of steel slab in the metallurgical reheating furnace or in the steel rolling process. The radiation-based temperature measurement for the casting billet/slab surface is greatly affected by the existence of the uneven iron scales. The aforementioned prior art cannot overcome the influence of the iron scale on the temperature measurement of the surface of casting billet/slab, so that the surface temperature of billet/slab cannot be measured accurately and stably. Hence, there is still a need for a temperature measuring method and apparatus for measuring the surface temperature of continuous casting billet/slab, which is able to overcome the influence of the iron scale on the surface of casting billet/slab.

SUMMARY OF THE INVENTION

It is one of the objects of the present invention to provide a temperature measuring apparatus capable of overcoming the influence of the iron scale on the surface of casting billet/slab for measuring the temperature of the surface of casting billet/slab.

The above object is accomplished by a temperature measuring apparatus, including a thermal imager, an infrared radiation thermometer, a mechanical scanning unit, an image and data processing system; the thermal imager, infrared radiation thermometer and mechanical scanning unit are connected to said image and data processing system respectively. said infrared radiation thermometer is installed on said mechanical scanning unit for measuring the temperature of the casting billet/slab surface by scanning. Said thermal imager is used for measuring the temperature distribution of a certain area on the surface of casting billet/slab by thermal imaging.

An optimum technical arrangement, with the feature that the spatial resolution range of a single pixel of said thermal imager meets the requirement of 0.5 mm~10 mm on the surface of casting billet/slab.

An optimum technical arrangement, with the feature that said thermal imager is covered with a cooling jacket, whilst cooling air is introduced into the cooling jacket.

An optimum technical arrangement, with the feature that a dust guard having a electrostatic and static pressure function is mounted in the front end of said cooling jacket of the thermal imager.

An optimum technical arrangement, with the feature that said dust guard has a conical casing, the dust grids of 5 mm~10 mm high are welded at every 30 mm~50 mm in inner side of said comical casing.

An optimum technical arrangement, with the feature that said infrared radiation thermometer is fixed inside the dustproof cooling jacket, the front end of which is a dustproof tube whose length is more than 10 times larger than the inner diameter.

An optimum technical arrangement, with the feature that said mechanical scanning unit consists of an electric motor driven part and a mechanical transmission part; said motor can be a stepping motor or a servo motor.

The experiments and observation in metallurgical sites show that along with the cooling and oxidizing process, the iron scale generated on the casting billet/slab coming out of continuous casting mould is uneven in thickness. But there are always some parts on the casting billet/slab surface where iron scale is so thin that it least affects the temperature measurement These parts have small geometrical sizes and distribute sporadically. In order to measure the temperature of the small areas on the surface of the casting billet/slab, the smaller the spatial resolution of the thermal imager is, the better the effect is for the temperature measurement One of the key points in the present invention is that the spatial resolution range of a single pixel of the thermal imager in the present invention meets the requirement of 0.5 mm~3 mm on the surface of the casting billet/slab.

The model based filtering is another key point of the present invention. Due to the actual temperature field in width direction of a certain surface of billet/slab being unevenly distributed, the higher measured value at a certain point can not solely prove that the iron scales have a smaller influence on temperature measurement of this point. Therefore, it has obvious that the accurate temperature of casting billet/slab surface can hardly be taken only by simply taking the maximum temperature value in aforementioned prior art. Model based filtering is applied in the present invention to solve this problem. The distribution values of the temperature in width direction of the casting billet surface, which are calculated based on the solidification heat transfer model with real time collected process parameters in continuous casting production or the statistical model obtained by numerous temperature measuring values, is to be compared with the corresponding distribution values of temperature taken by thermal imager. N relatively small values among the difference values between the above two groups of temperature values are selected and used to determine the measured values of the surface of casting billet/slab by filtering. The value of N varies with the measured lengths in width of the casting billet/slab surface.

The currently used thermal imagers possess better stability, whereas the elaborated infrared radiation thermometer operates more stably in abominable measuring conditions in metallurgical production. Due to the random occurrence of iron scales on the surface of casting billet/slab, only based on the thermal images taken by the thermal imager can the infrared radiation thermometer pinpoint the surfaces least affected by the iron scales. For further improving the stability of the whole system, the temperature values of some points within the measuring area of the thermal imager are measured by scanning by the infrared radiation thermometer driven by the mechanical scanning unit. The temperature values measured are input into the image and data processing system to compare with that taken by the thermal images of the corresponding points on the surface of casting billet/slab. The temperature values of the points least affected by iron scales taken by the infrared radiation thermometer are selected as the relative reference values to correct the temperature values measured by the thermal imager. Thus, after that, the thermal imager has a stability as said infrared radiation thermometer.

A line/array CCD or CMOS sensor is preferred for said thermal imager, whose gray-level revolution are not lower than 12 levels. The thermal imager can operate in the near infrared band of 760 nm~1000 nm, or is a colorimetric thermal imager. An ambient temperature sensor 21 inside the thermal imager is used for monitoring the environment temperature for temperature drift correction.

Said thermal imager is fixed in the cooling jacket, into which cooling air is introduced to cool down the thermal imager. A dust guard with a conical casing in inner side of which the dust grids of 5 mm-10 mm high are welded at every 30 mm~50 mm is equipped in the front end of the cooling jacket. The thermal images of the casting billet/slab surface taken by the above thermal imager can be directly taken by the array image sensor or by high-speed collecting data by the line image sensor whose sampling rate are more than 1 frame and less than 80 frames per second.

Said infrared radiation thermometer can be a single-band, colorimetric or multispectral radiation thermometer. The infrared radiation thermometer is fixed 5 inside the dustproof cooling jacket with a dustproof tube in the front end of it. The ratio between the total length and inner diameter of the dustproof tube is more than 10. An ambient temperature sensor 22 inside the infrared radiation thermometer is used to measure the temperature of working environment for compensating the temperature drift of the thermometer.

The mechanical scanning unit can be of a rectilinear or a circular-arc scanning type, whereas the circular-arc one is preferred.

Another object of the present invention is to provide a method of measuring the temperature field on the surface of casting billet/slab, which can get rid of the influence of iron scales on the surface of casting billet/slab.

To accomplish the above-mentioned object, in accordance with the present invention, a method of measuring the temperature field on the surface of casting billet is provided, comprising the steps of:

(1) As described earlier, a temperature measuring apparatus for measuring the temperature of the surface of casting billet/slab is provided, including a thermal imager, an infrared radiation thermometer, a mechanical scanning unit, an image and data processing system; said thermal imager, the infrared radiation thermometer and the mechanical scanning unit are connected to said image and data processing system respectively; said infrared radiation thermometer is mounted on said mechanical scanning unit.

(2) Said thermal imager is used to measure the temperature of a certain area on the surface of casting billet/slab by thermal imaging.

(3) The model temperature values calculated by said image and data processing system based on the solidification heat transfer model for casting billet/slab with casting process parameters or the statistic model obtained by numerous temperature measuring data are applied to compare with the temperature values of the thermal images collected by the thermal imager on the surface of casting billet/slab which are least affected by the iron scales. N relatively small values among the difference values between the above two groups of temperature data are selected to determine the measured value of the surface of casting billet/slab by filtering. The value of N varies with the measured lengths in width direction of the casting billet/slab surface.

(4) The temperature values of some points within the measuring area or nearby area of the thermal imager are measured by scanning of said infrared radiation thermometer driven by the mechanical scanning unit. The temperature values of these points are input into said image and data processing system, and be compared with the temperature values of the corresponding positions of the thermal images of the surface of casting billet/slab. The temperature values of the points least affected by iron scales taken by the infrared radiation thermometer is chosen as the correction values of the measured temperature values of the thermal imager.

An optimum technical arrangement, with the feature that said thermal imager may be equipped with a line/array CCD or CMOS sensor with gray-level resolution not lower than 12 levels. The thermal imager can operate in the near infrared band of 760 nm~1000 nm, or is a colorimetric thermal imager.

An optimum technical arrangement, with the feature that said thermal images on the surface of casting billet/slab can be obtained directly by the array image sensor, or by high-speed collecting data by the line image sensor with a sampling rate more than 1 frame and less than 80 frames per second.

An optimum technical arrangement, with the feature that the thermal imager is equipped with an ambient temperature sensor to measure the environment temperature for compensate the temperature drift of the thermal imager.

An optimum technical arrangement, with the feature that said thermal imager is covered with a cooling jacket, whilst cooling air is introduced into the said cooling jacket.

An optimum technical arrangement, with the feature that the front end of said cooling jacket is equipped with a electrostatic and static pressure dust guard having a conical casing in inner side of which the dust grids of 5 mm-10 mm high are welded at every 30 mm~50 mm An optimum technical arrangement, with the feature that said infrared radiation thermometer can be a single-band, colorimetric or multi-spectral one.

An optimum technical arrangement, with the feature that the mentioned infrared radiation thermometer is fixed inside the dustproof cooling jacket, the front end of which is equipped with a dustproof tube whose length is more than 10 times larger than the inner diameter An optimum technical arrangement, with the feature that an ambient temperature sensor is included inside the infrared radiation thermometer to compensate the temperature drift of the infrared radiation thermometer.

An optimum technical arrangement, with the feature that said mechanical scanning unit consists of an electric motor driven part and a machine transmitted part; said motor can be a stepping motor or a servo motor.

Additional objects, features and advantages of the present invention will be understood from the following description of the preferred embodiments in conjunction with the accompanying drawing, which is not mean to make restrictions to the protection range of the present invention.

DETAILED DESCRIPTION OF THE PREFERRED EMBODIMENTS

Figure 1:
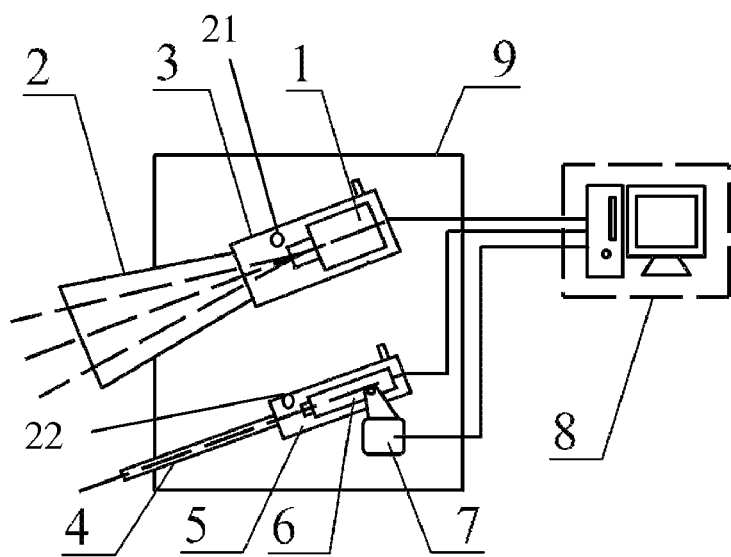
FIG. 1 illustrates schematically the structure of an embodiment of the temperature measuring apparatus according to the present invention.

As shown in FIG. 1, the temperature measuring apparatus of the present invention includes a thermal imager 1, a cooling jacket 3 of the thermal imager 1, an electrostatic and static pressure dust guard 2, an infrared radiation thermometer 6 (which is BCT-4 infrared radiation thermometer produced by Automatic Instrument Center of Northeastern University, China), a dustproof tube 4, a dustproof cooling jacket 5, a mechanical scanning unit 7. The infrared radiation thermometer 6 fixed inside the dustproof cooling jacket 5 is installed on the mechanical scanning unit 7. The thermal imager 1 is fixed inside cooling jacket 3. The thermal imager 1, infrared radiation thermometer 6 and mechanical scanning unit 7 are all installed inside a dustproof and heatproof chest 9, and are electrically connected to the image and data processing system 8. The dust grids of 5 mm-10 mm high are welded at every 30 mm~50 mm in the inner side of the dust guard 2 of the thermal imager 1.

The compressed cooling air is introduced into the cooling jacket 3 for protecting the thermal imager 1 against overheat, and then pour into the dustproof and heatproof chest 9 via fore part of the electrostatic and static pressure dust guard 2 to maintain a positive pressure and a lower temperature therein.

The length of the dustproof tube 4 in front end of the infrared radiation thermometer 6 is more than 10 times larger than its inner diameter so as to form a local static pressure to protect the optical system from dust. The mechanical scanning unit 7 powered by a motor can drive the infrared radiation thermometer 6 to perform a controllable scan on the surface of casting billet/slab. Said motor can be a stepping motor or a servo motor.

In the present embodiment, the thermal imager can be equipped with an array CCD sensor operating in near infrared band of 760 nm~1000 nm, whose gray-level resolution is 12 levels, spacial resolution is 1300×1024 pixels with minimal 1 mm on the surface of casting billet/slab, or a line/array CMOS sensor, or being a colorimetric thermal imager.

Figure 2:
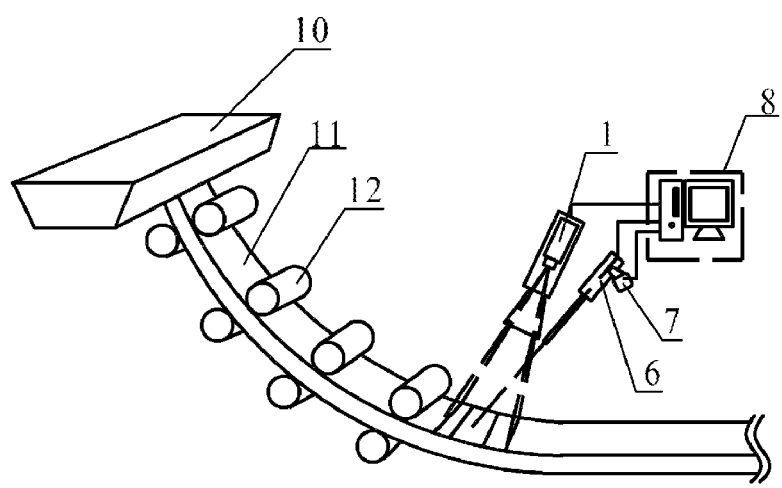
FIG. 2 is diagrammatic depiction illustrating use of a temperature measuring apparatus according to the present invention.

The measuring process of the surface temperature of casting billet/slab is described hereunder. As shown in FIG. 2, the digits 10, 11, 12 indicate the continuous casting tundish, the casting billet/slab, the continuous casting roller respectively. In operation, firstly, the thermal imager 1 forms a thermal image of the surface of casting billet/slab. The thermal image is send to the image and data processing system 8, in which the temperature values on the billet/slab surface points less influenced by the iron scales are selected and filtered by the model-calculated temperature values. Namely, said temperature values are used to compare with the model-calculated temperature values on the surface of casting billet/slab, and N relatively small difference values are selected, based on which the temperature measuring values after filtering are obtained by filtering. Then, the infrared radiation thermometer 6 driven by the mechanical scanning unit 7 scans and measures the temperature values of some certain points within the measuring area of the thermal imager on the surface of casting billet/slab according to the distribution of iron scale. These temperature values are send to the image and data processing system 8 to compare with the temperature values of relative points in the thermal image, then the temperature value in the measuring point which is least influenced by the iron scale, is chosen as the correction value of the temperature measuring values of the thermal images formed by the thermal imager. Finally, the actual temperature value on the surface of casting billet/slab is obtained.

Figure 3:
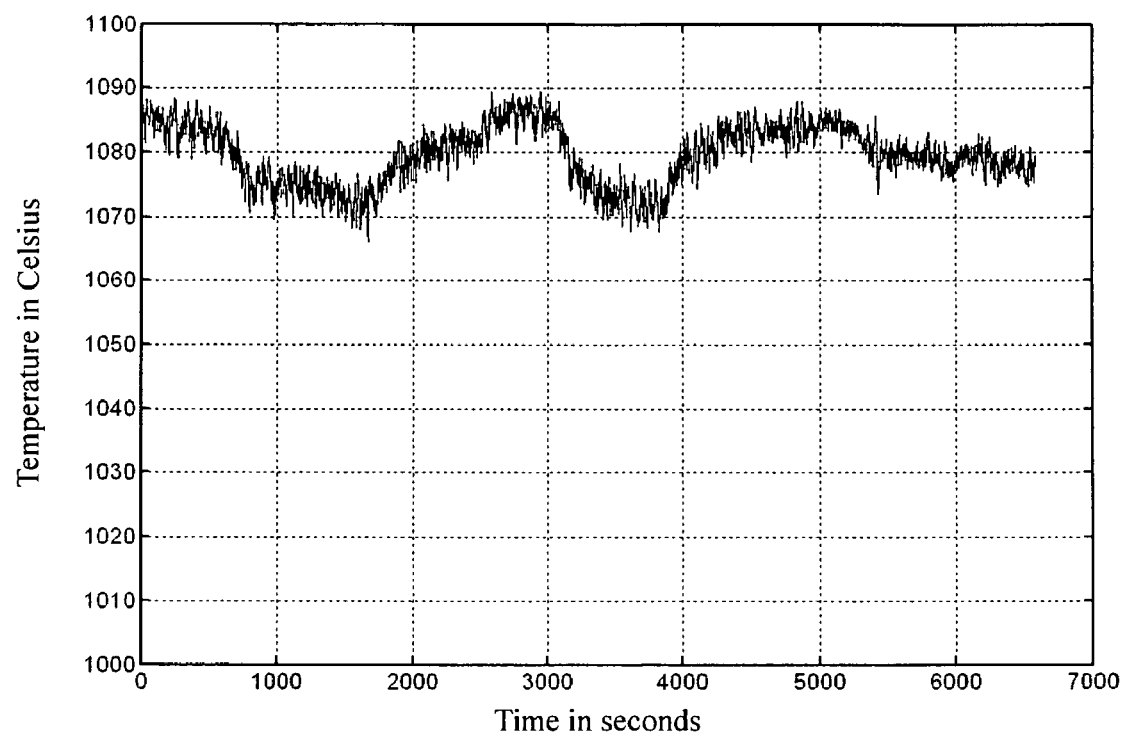
FIG. 3 is a temperature curve representing a test result on basis of an optimum embodiment according to the present invention.
Figure 4:
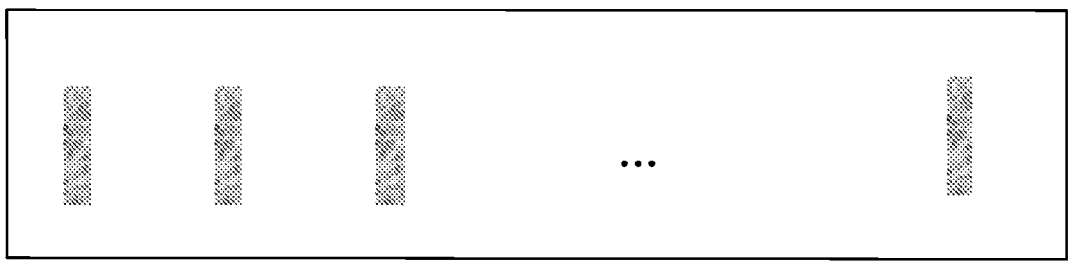
FIG. 4 is a representative diagram of dust grids.

FIG. 3 is a temperature curve representing a test result on basis of an optimum embodiment according to the present invention. It can be seen from the test result that the stability of temperature measurement has reached ±3° C. and the responding time is less than 1 second, and the temperature can be used by the controlling system as the temperature feedback signal.

Generally, the stability of the temperature measured by said prior art is larger than ±10° C. and the responding time is in 30 seconds~2 minutes, which are due to the great influence of the iron scale.

It is the beneficial effects of the present invention that the present invention makes use of the combination of the high-resolution thermal imager and the scan-type infrared radiation thermometer, through the model-based filtering method, has overcome the influence of iron scales on the surface of casting billet/slab, and has realized real-time stable measurement of surface temperature of casting billet/slab.

What is claimed is:

1. An apparatus for measuring a surface temperature field of a casting billet/slab, comprising:
   a thermal imager;
   an infrared radiation thermometer;
   a mechanical scanning unit; and
   an image and data processing system;
   wherein the thermal imager, the infrared radiation thermometer and the mechanical scanning unit are each connected to said image and data processing system;
   wherein said infrared radiation thermometer is installed onto the mechanical scanning unit and propelled thereby to scan the surface temperature field of the casting billet/slab; and
   wherein the thermal imager is configured to measure a surface temperature of an area of the casting billet/slab.

2. The apparatus for measuring the surface temperature field of claim 1, wherein a spatial resolution of a single pixel of said thermal imager is between 0.5 mm and 3 mm.

3. The apparatus for measuring the surface temperature field as in of claim 1, wherein the image and data processing system comprises a model calculation module for calculating the surface temperature of the area of the casting billet/slab.

4. The apparatus for measuring the surface temperature field of claim 1, further comprising a cooling jacket to cover the thermal imager and cooling air is introduced therein to prevent the thermal imager from overheating.

5. The apparatus for measuring the surface temperature field of claim 4, wherein a front end of the cooling jacket of the thermal imager is equipped with an electrostatic and static pressure dust guard.

6. The apparatus for measuring the surface temperature field of claim 5, wherein the electrostatic and static pressure dust guard has a conical casing the inner side of which is welded with dust grids from 5 mm to 10 mm in height spaced every 30 mm to 50 mm apart.

7. The apparatus for measuring the surface temperature field of claim 1, wherein the infrared radiation thermometer is housed inside a dustproof cooling jacket having a front end equipped with a dustproof tube whose longitudinal length is at least 10 times greater than an inner diameter thereof.

8. A method for measuring a surface temperature field of a casting billet/slab by using a thermal imager, an infrared radiation thermometer controlled by a mechanical scanning unit that are all individually connected to an image and data processing system, comprising a plurality of steps of:
  (1) measuring the surface temperature field of the casting billet/slab
    by using the infrared radiation thermometer to scan a surface of the casting billet/slab;
  (2) measuring a temperature of a surface area of the casting billet/slab by thermal imaging;
  (3) acquiring a model calculated value of the surface temperature field of the casting billet/slab based on one of a solidification heat transfer model of casting billet with casting process parameters and a statistic model from numerous temperature measuring values;
  (4) comparing a plurality of temperature values from a plurality of thermal images collected by the thermal imager with the model-calculated values and obtain N values representing differences there-between the plurality of temperature values and the model-calculated values;
  (5) measuring a plurality of temperature values within a measuring area or nearby area of the thermal imager by scanning using the infrared radiation thermometer;
  (6) inputting the plurality of temperature values into the image and data processing system and
  (7) comparing the plurality of temperature values with temperature values of the corresponding positions on the surface of casting billet/slab that are obtained by thermal imaging whereby temperature values of points least affected by iron scales taken by the infrared radiation thermometer is chosen as the correction values of the temperature measurement values of the thermal imager.

9. The method for measuring the surface temperature field of casting billet/slab of claim 8, wherein thermal images of the surface of casting billet/slab are obtained directly by one of an array image sensor of thermal imager and a line image sensor of the infrared radiation thermometer with a sampling rate more than 1 frame per second and less than 80 frames per second.

10. The method for measuring the surface temperature field of casting billet/slab of claim 8, wherein the thermal imager is equipped with an ambient temperature sensor to measure the environment temperature to determine temperature drift correction of the thermal imager, and said infrared radiation thermometer is also equipped with an ambient temperature sensor to compensate for any temperature drift.

* * * * *